(12) United States Patent
Young et al.

(10) Patent No.: US 10,024,439 B2
(45) Date of Patent: Jul. 17, 2018

(54) VALVE OVER-TRAVEL MECHANISM

(71) Applicant: Honeywell International Inc., Morristown, NJ (US)

(72) Inventors: Gregory Young, Blaine, MN (US); Donald J. Kasprzyk, Maple Grove, MN (US)

(73) Assignee: Honeywell International Inc., Morris Plains, NJ (US)

( * ) Notice: Subject to any disclaimer, the term of this patent is extended or adjusted under 35 U.S.C. 154(b) by 110 days.

(21) Appl. No.: 14/808,985

(22) Filed: Jul. 24, 2015

(65) Prior Publication Data

US 2016/0025228 A1   Jan. 28, 2016

Related U.S. Application Data

(63) Continuation-in-part of application No. 14/107,842, filed on Dec. 16, 2013.

(51) Int. Cl.
*F16K 37/00* (2006.01)
*F16K 1/52* (2006.01)
(Continued)

(52) U.S. Cl.
CPC ............ *F16K 1/52* (2013.01); *F16K 31/0655* (2013.01); *F16K 37/0025* (2013.01);
(Continued)

(58) Field of Classification Search
CPC ........ F16K 1/443; F16K 1/52; F16K 37/0008; F16K 37/0041
(Continued)

(56) References Cited

U.S. PATENT DOCUMENTS 156,769 A   11/1874   Cameron
424,581 A   4/1890   Sickels
(Continued)

FOREIGN PATENT DOCUMENTS

DE   3638604   5/1988
DE   19617852   10/1997
(Continued)

OTHER PUBLICATIONS

CSA, "B149.3S1-07 Supplement No. 1 to CAN/CAS-B149.3-05 Code for the Field Approval of Fuel-Related Components on Appliances and Equipment," 40 pages, Jan. 2007.
(Continued)

*Primary Examiner* — Reinaldo Sanchez-Medina
(74) *Attorney, Agent, or Firm* — Seager Tufte & Wickhem LLP

(57) ABSTRACT

A valve having an over-travel spring that does not necessarily need an excessively additional force to further close the valve once its valve seal comes into contact with a valve seat. The feature may be achieved by inserting an over-travel spring between a plate or stop attached to a valve stem, and a valve seal. The valve seal may come in contact with a valve seat when the valve is closed with movement of the valve stem. The valve stem may continue to travel after contact between the valve seal and the valve seat without additional force, other than that added by compressing the over-travel spring, and with a proof-of-closure sensor indicating valve closure. The valve stem may be moved in either direction for closing and opening the valve with an assist, such as a solenoid or other mechanism.

13 Claims, 7 Drawing Sheets

US 10,024,439 B2

Page 2

(51) Int. Cl.
*F16K 31/06* (2006.01)
*G05D 7/06* (2006.01)

(52) U.S. Cl.
CPC ....... *F16K 37/0041* (2013.01); *G05D 7/0635* (2013.01); *F23N 2035/14* (2013.01); *F23N 2035/24* (2013.01); *Y10T 137/8242* (2015.04)

(58) Field of Classification Search
USPC ......... 137/554, 556, 630.14, 630.15, 630.19, 137/630.22
See application file for complete search history.

(56) References Cited

U.S. PATENT DOCUMENTS

| | | | |
|---|---|---|---|
| 1,033,204 A | 7/1912 | Skinner |
| 1,147,840 A | 7/1915 | Bowser |
| 1,156,977 A | 10/1915 | Cloos |
| 1,165,315 A | 12/1915 | Cameron |
| 1,206,532 A | 11/1916 | Gray |
| 1,847,385 A | 3/1932 | Dengler |
| 2,196,798 A | 4/1940 | Horstmann |
| 2,403,692 A | 7/1946 | Tibbetts |
| 2,791,238 A | 5/1957 | Bryant |
| 2,975,307 A | 3/1961 | Schroeder et al. |
| 3,164,364 A | 1/1965 | McColl |
| 3,202,170 A | 8/1965 | Holbrook |
| 3,304,406 A | 2/1967 | King |
| 3,346,008 A | 10/1967 | Scaramucci |
| 3,381,623 A | 5/1968 | Elliott |
| 3,414,010 A | 12/1968 | Sparrow |
| 3,641,373 A | 2/1972 | Elkuch |
| 3,646,969 A | 3/1972 | Stampfli |
| 3,744,754 A | 7/1973 | Demi |
| 3,769,531 A | 10/1973 | Elkuch |
| 3,803,424 A | 4/1974 | Smiley et al. |
| 3,884,266 A | 5/1975 | Kondo |
| 3,947,644 A | 3/1976 | Uchikawa |
| 3,960,364 A | 6/1976 | Hargrave |
| 3,973,576 A | 8/1976 | Dietiker |
| 3,973,976 A | 8/1976 | Boyd |
| 3,993,939 A | 11/1976 | Slavin et al. |
| 4,114,652 A | 9/1978 | Oberle |
| 4,115,036 A | 9/1978 | Paterson |
| 4,140,936 A | 2/1979 | Bullock |
| 4,188,013 A | 2/1980 | Battersby et al. |
| 4,188,972 A | 2/1980 | Van Der Zee |
| 4,197,737 A | 4/1980 | Pittman |
| 4,242,080 A | 12/1980 | Tabei |
| 4,277,832 A | 7/1981 | Wong |
| 4,360,955 A | 11/1982 | Block |
| 4,402,340 A | 9/1983 | Lockwood, Jr. |
| 4,406,131 A | 9/1983 | Weasel, Jr. |
| 4,418,886 A | 12/1983 | Holzer |
| 4,442,853 A | 4/1984 | Gort |
| 4,450,868 A | 5/1984 | Duval et al. |
| 4,453,169 A | 6/1984 | Martner |
| 4,478,076 A | 10/1984 | Bohrer |
| 4,478,077 A | 10/1984 | Bohrer et al. |
| 4,481,776 A | 11/1984 | Araki et al. |
| 4,498,850 A | 2/1985 | Perlov et al. |
| 4,501,144 A | 2/1985 | Higashi et al. |
| 4,539,575 A | 9/1985 | Nilsson |
| 4,543,974 A | 10/1985 | Dietiker et al. |
| 4,576,050 A | 3/1986 | Lambert |
| 4,581,624 A | 4/1986 | O'Connor |
| 4,581,707 A | 4/1986 | Millar |
| 4,585,209 A | 4/1986 | Aine et al. |
| 4,619,438 A | 10/1986 | Coffee |
| 4,622,699 A | 11/1986 | Spriggs |
| 4,651,564 A | 3/1987 | Johnson et al. |
| 4,654,546 A | 3/1987 | Kirjavainen |
| 4,722,360 A | 2/1988 | Odajima et al. |
| 4,756,508 A | 7/1988 | Giachino et al. |
| 4,815,699 A | 3/1989 | Mueller |
| 4,821,999 A | 4/1989 | Ohtaka |
| 4,829,826 A | 5/1989 | Valentin et al. |
| 4,835,717 A | 5/1989 | Michel et al. |
| 4,836,247 A | 6/1989 | Chuang |
| 4,898,200 A | 2/1990 | Odajima et al. |
| 4,911,616 A | 3/1990 | Laumann, Jr. |
| 4,938,742 A | 7/1990 | Smits |
| 4,939,405 A | 7/1990 | Okuyama et al. |
| 5,022,435 A | 6/1991 | Jaw-Shiunn |
| 5,065,978 A | 11/1991 | Albarda et al. |
| 5,069,419 A | 12/1991 | Jerman |
| 5,070,252 A | 12/1991 | Castenschiold et al. |
| 5,078,581 A | 1/1992 | Blum et al. |
| 5,082,242 A | 1/1992 | Bonne et al. |
| 5,082,246 A | 1/1992 | Stanley et al. |
| 5,085,562 A | 2/1992 | Van Lintel |
| 5,096,388 A | 3/1992 | Weinberg |
| 5,129,794 A | 7/1992 | Beatty |
| 5,146,941 A | 9/1992 | Statler |
| 5,148,074 A | 9/1992 | Fujita et al. |
| 5,171,132 A | 12/1992 | Miyazaki et al. |
| 5,176,358 A | 1/1993 | Bonne et al. |
| 5,180,288 A | 1/1993 | Richter et al. |
| 5,180,623 A | 1/1993 | Ohnstein |
| 5,186,054 A | 2/1993 | Sekimura |
| 5,190,068 A | 3/1993 | Philbin |
| 5,192,197 A | 3/1993 | Culp |
| 5,193,993 A | 3/1993 | Dietiker |
| 5,199,456 A | 4/1993 | Love et al. |
| 5,199,462 A | 4/1993 | Baker |
| 5,203,688 A | 4/1993 | Dietiker |
| 5,205,323 A | 4/1993 | Baker |
| 5,206,557 A | 4/1993 | Bobbio |
| 5,215,112 A | 6/1993 | Davison |
| 5,215,115 A | 6/1993 | Dietiker |
| 5,219,278 A | 6/1993 | Van Lintel |
| 5,223,822 A | 6/1993 | Stommes |
| 5,224,843 A | 7/1993 | Van Lintel |
| 5,244,527 A | 9/1993 | Aoyagi |
| 5,244,537 A | 9/1993 | Ohnstein |
| 5,263,514 A | 11/1993 | Reeves |
| 5,294,089 A | 3/1994 | LaMarca |
| 5,322,258 A | 6/1994 | Bosch et al. |
| 5,323,999 A | 6/1994 | Bonne |
| 5,325,880 A | 7/1994 | Johnson et al. |
| 5,336,062 A | 8/1994 | Richter |
| 5,368,571 A | 11/1994 | Horres, Jr. |
| 5,441,597 A | 8/1995 | Bonne et al. |
| 5,449,142 A | 9/1995 | Banick |
| 5,452,878 A | 9/1995 | Gravesen et al. |
| 5,460,196 A | 10/1995 | Yonnet |
| 5,477,877 A | 12/1995 | Schulze et al. |
| 5,499,909 A | 3/1996 | Yamada et al. |
| 5,513,611 A | 5/1996 | Ricouard et al. |
| 5,520,533 A | 5/1996 | Vrolijk |
| 5,526,172 A | 6/1996 | Kanack |
| 5,529,465 A | 6/1996 | Zengerle et al. |
| 5,536,963 A | 7/1996 | Polla |
| 5,538,220 A | 7/1996 | LaMarca |
| 5,541,465 A | 7/1996 | Higuchi et al. |
| 5,552,654 A | 9/1996 | Konno et al. |
| 5,565,832 A | 10/1996 | Haller et al. |
| 5,571,401 A | 11/1996 | Lewis et al. |
| 5,580,444 A | 12/1996 | Burrows |
| 5,590,235 A | 12/1996 | Rappenecker et al. |
| 5,621,164 A | 4/1997 | Woodbury et al. |
| 5,642,015 A | 6/1997 | Whitehead et al. |
| 5,676,342 A | 10/1997 | Otto et al. |
| 5,683,159 A | 11/1997 | Johnson |
| 5,696,662 A | 12/1997 | Bauhahn |
| 5,725,363 A | 3/1998 | Bustgens et al. |
| 5,735,503 A | 4/1998 | Hietkamp |
| 5,741,978 A | 4/1998 | Gudmundsson |
| 5,748,432 A | 5/1998 | Przywozny et al. |
| 5,755,259 A | 5/1998 | Schulze et al. |
| 5,759,014 A | 6/1998 | Van Lintel |
| 5,759,015 A | 6/1998 | Van Lintel et al. |
| 5,769,043 A | 6/1998 | Nitkiewicz |
| 5,774,372 A | 6/1998 | Berwanger |

(56) References Cited

U.S. PATENT DOCUMENTS

| | | |
|---|---|---|
| 5,792,957 A | 8/1998 | Luder et al. |
| 5,808,205 A | 9/1998 | Romo |
| 5,822,170 A | 10/1998 | Cabuz et al. |
| 5,827,950 A | 10/1998 | Woodbury et al. |
| 5,836,750 A | 11/1998 | Cabuz |
| 5,839,467 A | 11/1998 | Saaski et al. |
| 5,847,523 A | 12/1998 | Rappenecker et al. |
| 5,863,708 A | 1/1999 | Zanzucchi et al. |
| 5,887,847 A | 3/1999 | Holborow |
| 5,893,389 A | 4/1999 | Cunningham |
| 5,901,939 A | 5/1999 | Cabuz et al. |
| 5,911,872 A | 6/1999 | Lewis et al. |
| 5,918,852 A | 7/1999 | Otto |
| 5,933,573 A | 8/1999 | Lukenich et al. |
| 5,944,257 A | 8/1999 | Dietiker et al. |
| 5,954,079 A | 9/1999 | Barth et al. |
| 5,954,089 A | 9/1999 | Seymour |
| 5,957,158 A | 9/1999 | Volz et al. |
| 5,959,448 A | 9/1999 | Baranski et al. |
| 5,967,124 A | 10/1999 | Cook et al. |
| 5,971,355 A | 10/1999 | Biegelsen et al. |
| 5,986,573 A | 11/1999 | Franklin et al. |
| 6,003,552 A | 12/1999 | Shank et al. |
| 6,021,652 A | 2/2000 | Walker |
| 6,050,281 A | 4/2000 | Adams et al. |
| 6,057,771 A | 5/2000 | Lakra |
| 6,106,245 A | 8/2000 | Cabuz |
| 6,109,889 A | 8/2000 | Zengerle et al. |
| 6,116,863 A | 9/2000 | Ahn et al. |
| 6,122,973 A | 9/2000 | Nomura et al. |
| 6,151,967 A | 11/2000 | McIntosh et al. |
| 6,152,168 A | 11/2000 | Ohmi et al. |
| 6,155,531 A | 12/2000 | Holborow et al. |
| 6,167,761 B1 | 1/2001 | Hanzawa et al. |
| 6,176,247 B1 | 1/2001 | Winchcomb et al. |
| 6,179,000 B1 | 1/2001 | Zdobinski et al. |
| 6,179,586 B1 | 1/2001 | Herb et al. |
| 6,182,941 B1 | 2/2001 | Scheurenbrand et al. |
| 6,184,607 B1 | 2/2001 | Cabuz et al. |
| 6,189,568 B1 | 2/2001 | Bergum et al. |
| 6,215,221 B1 | 4/2001 | Cabuz et al. |
| 6,240,944 B1 | 6/2001 | Ohnstein et al. |
| 6,242,909 B1 | 6/2001 | Dorsey et al. |
| 6,247,919 B1 | 6/2001 | Welz, Jr. et al. |
| 6,255,609 B1 | 7/2001 | Samuelson et al. |
| 6,263,908 B1 | 7/2001 | Love et al. |
| 6,288,472 B1 | 9/2001 | Cabuz et al. |
| 6,297,640 B1 | 10/2001 | Hayes |
| 6,321,781 B1 | 11/2001 | Kurth |
| 6,360,773 B1 | 3/2002 | Rhodes |
| 6,373,682 B1 | 4/2002 | Goodwin-Johansson |
| 6,386,234 B2 | 5/2002 | Sontag |
| 6,390,027 B1 | 5/2002 | Lyons et al. |
| 6,397,798 B1 | 6/2002 | Fiaccabrino |
| 6,401,753 B2 | 6/2002 | Neu |
| 6,418,793 B1 | 7/2002 | Pechoux et al. |
| 6,445,053 B1 | 9/2002 | Cho |
| 6,450,200 B1 | 9/2002 | Ollivier |
| 6,460,567 B1 | 10/2002 | Hansen, III et al. |
| 6,463,546 B1 | 10/2002 | Jeske et al. |
| 6,496,348 B2 | 12/2002 | McIntosh |
| 6,496,786 B1 | 12/2002 | Dieterle et al. |
| 6,505,838 B1 | 1/2003 | Cavaliere |
| 6,508,528 B1 | 1/2003 | Fujii et al. |
| 6,520,753 B1 | 2/2003 | Grosjean et al. |
| 6,536,287 B2 | 3/2003 | Beekhuizen et al. |
| 6,550,495 B1 | 4/2003 | Schulze |
| 6,553,979 B2 | 4/2003 | Albright |
| 6,561,791 B1 | 5/2003 | Vrolijk et al. |
| 6,563,233 B1 | 5/2003 | Hinks |
| 6,564,824 B2 | 5/2003 | Lowery et al. |
| 6,571,817 B1 | 6/2003 | Bohan, Jr. |
| 6,572,077 B1 | 6/2003 | Worner |
| 6,579,087 B1 | 6/2003 | Vrolijk |
| 6,584,852 B2 | 7/2003 | Suzuki et al. |
| 6,590,267 B1 | 7/2003 | Goodwin-Johansson et al. |
| 6,606,911 B2 | 8/2003 | Akiyama et al. |
| 6,619,388 B2 | 9/2003 | Dietz et al. |
| 6,619,612 B2 | 9/2003 | Freisinger et al. |
| 6,623,012 B1 | 9/2003 | Perry et al. |
| 6,640,642 B1 | 11/2003 | Onose et al. |
| 6,644,351 B2 | 11/2003 | LaMarca et al. |
| 6,650,211 B2 | 11/2003 | Pimouguet |
| 6,651,506 B2 | 11/2003 | Lee et al. |
| 6,651,636 B1 | 11/2003 | Albright |
| 6,651,954 B1 | 11/2003 | Porcher et al. |
| 6,655,409 B1 | 12/2003 | Steenburgh et al. |
| 6,655,652 B2 | 12/2003 | Meinhof |
| 6,658,928 B1 | 12/2003 | Pollack et al. |
| 6,676,580 B2 | 1/2004 | Tsai et al. |
| 6,704,186 B2 | 3/2004 | Ishikura |
| 6,725,167 B2 | 4/2004 | Grumstrup et al. |
| 6,728,600 B1 | 4/2004 | Contaldo et al. |
| 6,729,601 B2 | 5/2004 | Freisinger et al. |
| 6,742,541 B2 | 6/2004 | Pimouguet |
| 6,768,406 B1 | 7/2004 | Fiaccabrino |
| 6,796,326 B2 | 9/2004 | Bayer |
| 6,813,954 B2 | 11/2004 | Gokhfeld |
| 6,814,102 B2 | 11/2004 | Hess et al. |
| 6,814,339 B2 | 11/2004 | Berger et al. |
| 6,819,208 B1 | 11/2004 | Peghaire et al. |
| 6,820,650 B2 | 11/2004 | Solet et al. |
| 6,825,632 B2 | 11/2004 | Hahn et al. |
| 6,826,947 B2 | 12/2004 | Solet et al. |
| 6,851,298 B2 | 2/2005 | Miura et al. |
| 6,874,367 B2 | 4/2005 | Jakobsen |
| 6,877,380 B2 | 4/2005 | Lewis |
| 6,877,383 B2 | 4/2005 | Horie et al. |
| 6,880,548 B2 | 4/2005 | Schultz et al. |
| 6,880,567 B2 | 4/2005 | Klaver et al. |
| 6,885,184 B1 | 4/2005 | Gofman |
| 6,888,354 B1 | 5/2005 | Gofman |
| 6,889,705 B2 | 5/2005 | Newman et al. |
| 6,892,756 B2 | 5/2005 | Schulze |
| 6,906,484 B1 | 6/2005 | Berroth et al. |
| 6,923,069 B1 | 8/2005 | Stewart |
| 6,956,340 B2 | 10/2005 | Schondelmaier et al. |
| 6,956,343 B2 | 10/2005 | Berroth et al. |
| 6,968,851 B2 | 11/2005 | Ramirez et al. |
| 6,981,426 B2 | 1/2006 | Wang et al. |
| 6,983,759 B2 | 1/2006 | Maichel et al. |
| 6,994,308 B1 | 2/2006 | Wang et al. |
| 6,997,684 B2 | 2/2006 | Hahn et al. |
| 7,000,635 B2 | 2/2006 | Erbe et al. |
| 7,004,034 B2 | 2/2006 | Chen |
| 7,039,502 B2 | 5/2006 | Berwanger et al. |
| 7,066,203 B2 | 6/2006 | Baarda |
| 7,082,835 B2 | 8/2006 | Cook et al. |
| 7,089,959 B2 | 8/2006 | Cai |
| 7,093,611 B2 | 8/2006 | Murray et al. |
| 7,107,820 B2 | 9/2006 | Nunnally et al. |
| 7,119,504 B2 | 10/2006 | Dornhof |
| 7,121,525 B2 | 10/2006 | Gelez |
| 7,174,771 B2 | 2/2007 | Cooper |
| 7,216,547 B1 | 5/2007 | Stewart et al. |
| 7,223,094 B2 | 5/2007 | Goebel |
| 7,225,056 B2 | 5/2007 | Bolduan et al. |
| 7,249,610 B2 | 7/2007 | Moses |
| 7,290,502 B2 | 11/2007 | Kidd et al. |
| 7,297,640 B2 | 11/2007 | Xie et al. |
| 7,302,863 B2 | 12/2007 | Kielb et al. |
| 7,319,300 B2 | 1/2008 | Hahn |
| 7,328,719 B2 | 2/2008 | Madden |
| 7,347,221 B2 | 3/2008 | Berger et al. |
| 7,360,751 B2 | 4/2008 | Herrfurth |
| 7,390,172 B2 | 6/2008 | Winkler |
| 7,402,925 B2 | 7/2008 | Best et al. |
| 7,405,609 B2 | 7/2008 | Krotsch |
| 7,422,028 B2 | 9/2008 | Nugent et al. |
| 7,451,600 B2 | 11/2008 | Patel et al. |
| 7,451,644 B2 | 11/2008 | Karte |
| 7,453,696 B2 | 11/2008 | Tungl et al. |
| 7,461,828 B2 | 12/2008 | Kidprasert |
| 7,493,822 B2 | 2/2009 | Stewart et al. |

(56) References Cited

U.S. PATENT DOCUMENTS

| | | |
|---|---|---|
| 7,503,221 B2 | 3/2009 | Wade |
| 7,520,487 B2 | 4/2009 | Mattes |
| 7,543,604 B2 | 6/2009 | Benda |
| 7,553,151 B2 | 6/2009 | O'Mara et al. |
| 7,556,238 B2 | 7/2009 | Seberger |
| 7,574,896 B1 | 8/2009 | Cooper |
| 7,586,228 B2 | 9/2009 | Best |
| 7,586,276 B2 | 9/2009 | Dornhof |
| 7,624,755 B2 | 12/2009 | Benda et al. |
| 7,644,731 B2 | 1/2010 | Benda et al. |
| 7,669,461 B2 | 3/2010 | Kates |
| 7,688,011 B2 | 3/2010 | Berroth et al. |
| 7,715,168 B2 | 5/2010 | Gofman et al. |
| 7,735,509 B2 | 6/2010 | Galloway et al. |
| 7,740,024 B2 | 6/2010 | Brodeur et al. |
| 7,759,884 B2 | 7/2010 | Dufner et al. |
| 7,811,069 B2 | 10/2010 | Fleig |
| 7,812,488 B2 | 10/2010 | Cosco et al. |
| 7,816,813 B2 | 10/2010 | Yagudayev et al. |
| 7,841,541 B2 | 11/2010 | Ardelt et al. |
| 7,869,971 B2 | 1/2011 | Varga |
| 7,880,421 B2 | 2/2011 | Karwath |
| 7,880,427 B2 | 2/2011 | Foll et al. |
| 7,890,276 B2 | 2/2011 | Killion et al. |
| 7,891,972 B2 | 2/2011 | Blank et al. |
| 7,898,372 B2 | 3/2011 | Melchionne, Jr. |
| 7,902,776 B2 | 3/2011 | Karwath |
| 7,905,251 B2 | 3/2011 | Flanders |
| 7,922,481 B2 | 4/2011 | Geiger et al. |
| 7,940,189 B2 | 5/2011 | Brown |
| 8,020,585 B2 | 9/2011 | Shock et al. |
| 8,066,255 B2 | 11/2011 | Wang |
| 8,109,289 B2 | 2/2012 | Trnka et al. |
| 8,201,572 B2 | 6/2012 | Segal |
| 8,205,484 B2 | 6/2012 | Sasaki |
| 8,225,814 B2 | 7/2012 | Igarashi |
| 8,240,636 B2 | 8/2012 | Smith |
| 8,271,141 B2 | 9/2012 | Cummings et al. |
| 8,307,845 B2 | 11/2012 | Kouchi et al. |
| 8,387,441 B2 | 3/2013 | Falta et al. |
| 8,424,363 B2 | 4/2013 | Caron |
| 8,639,464 B2 | 1/2014 | Artiuch et al. |
| 8,899,264 B2 | 12/2014 | Young et al. |
| 2002/0157713 A1 | 10/2002 | Pimouguet |
| 2002/0175791 A1 | 11/2002 | LaMarca et al. |
| 2003/0011136 A1 | 1/2003 | Ramirez et al. |
| 2003/0117098 A1 | 6/2003 | Berroth et al. |
| 2003/0150499 A1 | 8/2003 | Solet et al. |
| 2003/0167851 A1 | 9/2003 | Parker |
| 2003/0201414 A1 | 10/2003 | Freisinger et al. |
| 2004/0035211 A1 | 2/2004 | Pinto et al. |
| 2004/0129909 A1 | 7/2004 | Wiese |
| 2004/0263103 A1 | 12/2004 | Weisser et al. |
| 2005/0058961 A1 | 3/2005 | Moses |
| 2005/0166979 A1 | 8/2005 | Berger et al. |
| 2005/0255418 A1 | 11/2005 | Goebel |
| 2005/0279956 A1 | 12/2005 | Berger et al. |
| 2006/0202572 A1 | 9/2006 | Tungl et al. |
| 2006/0226299 A1 | 10/2006 | Tulle et al. |
| 2006/0228237 A1 | 10/2006 | Winkler |
| 2006/0243334 A1 | 11/2006 | Brochhaus et al. |
| 2006/0260701 A1 | 11/2006 | Mattes |
| 2006/0272712 A1 | 12/2006 | Sontag |
| 2007/0024225 A1 | 2/2007 | Hahn et al. |
| 2007/0068511 A1 | 3/2007 | Bachinsky et al. |
| 2007/0089789 A1 | 4/2007 | Mudd et al. |
| 2007/0095144 A1 | 5/2007 | Oboodi et al. |
| 2007/0164243 A1 | 7/2007 | Volz |
| 2007/0189739 A1 | 8/2007 | Dufner et al. |
| 2007/0241705 A1 | 10/2007 | Karwath |
| 2007/0256478 A1 | 11/2007 | Guadagnoia et al. |
| 2007/0257628 A1 | 11/2007 | Gofman et al. |
| 2008/0035456 A1 | 2/2008 | Melchionn, Jr. |
| 2008/0099082 A1 | 5/2008 | Moenkhaus |
| 2008/0156077 A1 | 7/2008 | Flanders et al. |
| 2008/0157707 A1 | 7/2008 | Jeske et al. |
| 2008/0297084 A1 | 12/2008 | Berroth et al. |
| 2008/0315807 A1 | 12/2008 | Loffler et al. |
| 2008/0318098 A1 | 12/2008 | Matsunaga |
| 2008/0318172 A1 | 12/2008 | Geiger et al. |
| 2009/0068503 A1 | 3/2009 | Yamazaki et al. |
| 2009/0126798 A1 | 5/2009 | Mather |
| 2009/0146091 A1 | 6/2009 | Ams et al. |
| 2009/0148798 A1 | 6/2009 | Geiger et al. |
| 2009/0240445 A1 | 9/2009 | Umekage et al. |
| 2009/0280989 A1 | 11/2009 | Astra et al. |
| 2010/0018324 A1 | 1/2010 | Killian et al. |
| 2010/0043896 A1 | 2/2010 | Shock et al. |
| 2010/0064818 A1 | 3/2010 | Shubert |
| 2010/0074777 A1 | 3/2010 | Laufer et al. |
| 2010/0102259 A1 | 4/2010 | Forster |
| 2010/0180688 A1 | 7/2010 | Khemet et al. |
| 2010/0180882 A1 | 7/2010 | Oberhomburg et al. |
| 2010/0193045 A1 | 8/2010 | Xu |
| 2010/0254826 A1 | 10/2010 | Streng et al. |
| 2010/0269931 A1 | 10/2010 | Seebauer |
| 2010/0282988 A1 | 11/2010 | Kasprzyk et al. |
| 2010/0315027 A1 | 12/2010 | Wystup et al. |
| 2011/0025237 A1 | 2/2011 | Wystup et al. |
| 2011/0033808 A1 | 2/2011 | Geiger et al. |
| 2011/0039217 A1 | 2/2011 | Happe |
| 2011/0046903 A1 | 2/2011 | Franklin |
| 2011/0080072 A1 | 4/2011 | Strobel et al. |
| 2011/0137579 A1 | 6/2011 | Seebauer |
| 2011/0240157 A1 | 10/2011 | Jones et al. |
| 2011/0266473 A1 | 11/2011 | Santinanavat et al. |
| 2013/0152673 A1 | 6/2013 | Young et al. |
| 2013/0153036 A1 | 6/2013 | Young et al. |
| 2013/0153041 A1 | 6/2013 | Kucera |
| 2013/0153042 A1 | 6/2013 | Young et al. |
| 2013/0153062 A1 | 6/2013 | Young et al. |
| 2013/0153798 A1 | 6/2013 | Kucera et al. |
| 2013/0154841 A1 | 6/2013 | Kucera et al. |
| 2014/0080075 A1 | 3/2014 | Young et al. |
| 2014/0096850 A1 | 4/2014 | Filkovski et al. |
| 2015/0107675 A1 | 4/2015 | Kucera |

FOREIGN PATENT DOCUMENTS

| | | |
|---|---|---|
| DE | 19824521 | 12/1999 |
| DE | 102005033611 | 10/2006 |
| EP | 0275439 | 7/1988 |
| EP | 0282758 | 9/1988 |
| EP | 0356690 | 5/1993 |
| EP | 0563787 | 10/1993 |
| EP | 0617234 | 9/1994 |
| EP | 0522479 | 5/1996 |
| EP | 0744821 | 11/1996 |
| EP | 0645562 | 12/1996 |
| EP | 0678178 | 12/1996 |
| EP | 0664422 | 4/1997 |
| EP | 0665396 | 1/1998 |
| EP | 0822376 | 2/1998 |
| EP | 0817931 | 12/1998 |
| EP | 0652501 | 3/1999 |
| EP | 0907052 | 4/1999 |
| EP | 0817934 | 5/1999 |
| EP | 0896192 | 10/1999 |
| EP | 0952357 | 10/1999 |
| EP | 0757200 | 4/2000 |
| EP | 1031792 | 8/2000 |
| EP | 1069357 | 1/2001 |
| EP | 0896191 | 2/2001 |
| EP | 1084358 | 3/2001 |
| EP | 0881435 | 9/2001 |
| EP | 1186779 | 3/2002 |
| EP | 0976957 | 4/2002 |
| EP | 1157205 | 9/2002 |
| EP | 1121511 | 4/2003 |
| EP | 0992658 | 5/2003 |
| EP | 1323966 | 7/2003 |
| EP | 1078187 | 8/2003 |
| EP | 1084357 | 8/2003 |
| EP | 1382907 | 1/2004 |

(56) References Cited

FOREIGN PATENT DOCUMENTS

| | | |
|---|---|---|
| EP | 1403885 | 3/2004 |
| EP | 1413045 | 4/2004 |
| EP | 1424708 | 6/2004 |
| EP | 1176317 | 8/2004 |
| EP | 1269054 | 8/2004 |
| EP | 1484509 | 12/2004 |
| EP | 1073192 | 1/2005 |
| EP | 1191676 | 1/2005 |
| EP | 1275039 | 1/2005 |
| EP | 1499008 | 1/2005 |
| EP | 1446607 | 3/2005 |
| EP | 1510756 | 3/2005 |
| EP | 1299665 | 4/2005 |
| EP | 1324496 | 6/2005 |
| EP | 1535388 | 6/2005 |
| EP | 1584870 | 10/2005 |
| EP | 1243857 | 12/2005 |
| EP | 1282798 | 12/2005 |
| EP | 0843287 | 2/2006 |
| EP | 1346463 | 3/2006 |
| EP | 1659462 | 5/2006 |
| EP | 1703140 | 9/2006 |
| EP | 1703146 | 9/2006 |
| EP | 1183772 | 10/2006 |
| EP | 1303718 | 10/2006 |
| EP | 1314240 | 10/2006 |
| EP | 1256763 | 11/2006 |
| EP | 1727268 | 11/2006 |
| EP | 1559936 | 12/2006 |
| EP | 1748534 | 1/2007 |
| EP | 1748545 | 1/2007 |
| EP | 1327808 | 2/2007 |
| EP | 1329659 | 2/2007 |
| EP | 1291532 | 6/2007 |
| EP | 1610046 | 6/2007 |
| EP | 1592905 | 7/2007 |
| EP | 1610045 | 7/2007 |
| EP | 1727261 | 10/2007 |
| EP | 1860328 | 11/2007 |
| EP | 1882882 | 1/2008 |
| EP | 1626321 | 2/2008 |
| EP | 1848907 | 4/2008 |
| EP | 1936778 | 6/2008 |
| EP | 1536169 | 11/2008 |
| EP | 1298679 | 12/2008 |
| EP | 1714040 | 12/2008 |
| EP | 2014979 | 1/2009 |
| EP | 1669648 | 2/2009 |
| EP | 2048439 | 4/2009 |
| EP | 2107248 | 7/2009 |
| EP | 2093545 | 8/2009 |
| EP | 1715229 | 10/2009 |
| EP | 2116857 | 11/2009 |
| EP | 2119946 | 11/2009 |
| EP | 1370787 | 3/2010 |
| EP | 1413044 | 3/2010 |
| EP | 2164164 | 3/2010 |
| EP | 2177796 | 4/2010 |
| EP | 2178201 | 4/2010 |
| EP | 1970610 | 5/2010 |
| EP | 2197101 | 6/2010 |
| EP | 2068056 | 8/2010 |
| EP | 2212984 | 8/2010 |
| EP | 1712800 | 10/2010 |
| EP | 2118493 | 10/2010 |
| EP | 2242344 | 10/2010 |
| EP | 1715582 | 11/2010 |
| EP | 1675757 | 12/2010 |
| EP | 2267883 | 12/2010 |
| EP | 1703139 | 1/2011 |
| EP | 2286976 | 2/2011 |
| EP | 1596495 | 4/2011 |
| EP | 2306622 | 4/2011 |
| EP | 2010500 | 6/2011 |
| EP | 2113696 | 7/2011 |
| GB | 2099158 | 12/1982 |
| GB | 2327750 | 2/1999 |
| JP | 02-086258 | 3/1990 |
| JP | 05-219760 | 8/1993 |
| JP | 9061284 | 3/1997 |
| JP | 9184600 | 7/1997 |
| JP | 2004125809 | 4/2004 |
| JP | 2004309159 | 11/2004 |
| JP | 2008286478 | 11/2008 |
| SU | 744877 | 6/1980 |
| WO | WO 87/05375 | 9/1987 |
| WO | WO 96/27095 | 9/1996 |
| WO | WO 97/29538 | 8/1997 |
| WO | WO 99/24758 | 5/1999 |
| WO | WO 99/60292 | 11/1999 |
| WO | WO 99/64769 | 12/1999 |
| WO | WO 99/64770 | 12/1999 |
| WO | WO 00/28215 | 5/2000 |
| WO | WO 01/06179 | 1/2001 |
| WO | WO 01/33078 | 5/2001 |
| WO | WO 01/61226 | 8/2001 |
| WO | WO 01/73297 | 10/2001 |
| WO | WO 01/90617 | 11/2001 |
| WO | WO 02/04852 | 1/2002 |
| WO | WO 02/077502 | 10/2002 |
| WO | WO 02/084156 | 10/2002 |
| WO | WO 02/086365 | 10/2002 |
| WO | WO 02/086918 | 10/2002 |
| WO | WO 02/097840 | 12/2002 |
| WO | WO 2004/059830 | 7/2004 |
| WO | WO 2004/070245 | 8/2004 |
| WO | WO 2005/042313 | 3/2005 |
| WO | WO 2005/076455 | 8/2005 |
| WO | WO 2005/076456 | 8/2005 |
| WO | WO 2005/085652 | 9/2005 |
| WO | WO 2005/094150 | 10/2005 |
| WO | WO 2006/000366 | 1/2006 |
| WO | WO 2006/000367 | 1/2006 |
| WO | WO 2006/053816 | 3/2006 |
| WO | WO 2006/039956 | 4/2006 |
| WO | WO 2006/042635 | 4/2006 |
| WO | WO 2006/077069 | 7/2006 |
| WO | WO 2006/088367 | 8/2006 |
| WO | WO 2007/012419 | 2/2007 |
| WO | WO 2007/093312 | 8/2007 |
| WO | WO 2007/140927 | 12/2007 |
| WO | WO 2008/061575 | 3/2008 |
| WO | WO 2008/039061 | 4/2008 |
| WO | WO 2008/119404 | 10/2008 |
| WO | WO 2008/141911 | 11/2008 |
| WO | WO 2008/148401 | 12/2008 |
| WO | WO 2009/000481 | 12/2008 |
| WO | WO 2009/049694 | 4/2009 |
| WO | WO 2009/065815 | 5/2009 |
| WO | WO 2009/073510 | 6/2009 |
| WO | WO 2009/089857 | 7/2009 |
| WO | WO 2009/126020 | 10/2009 |
| WO | WO 2010/018192 | 2/2010 |
| WO | WO 2010/052137 | 5/2010 |
| WO | WO 2010/056111 | 5/2010 |
| WO | WO 2010/083877 | 7/2010 |
| WO | WO 2011/010274 | 1/2011 |
| WO | WO 2011/045776 | 4/2011 |
| WO | WO 2011/047895 | 4/2011 |
| WO | WO 2011/051002 | 5/2011 |
| WO | WO 2011/069805 | 6/2011 |
| WO | WO 2011/072888 | 6/2011 |
| WO | WO 2011/092011 | 8/2011 |
| WO | WO 2011/095928 | 8/2011 |
| WO | WO 2013/0177542 | 11/2013 |

OTHER PUBLICATIONS

European Search Report for EP Application Serial No. 14194824.0 dated May 21, 2015.
"Flexible, Compact and with a High Performance—the New Valvario, G. Kromschroder AG Launches it's New, Improved Series of Gas Fittings," Press Release, 2 pages, 2003.

(56) References Cited

OTHER PUBLICATIONS

"Large-Scale Linearization Circuit for Electrostatic Motors" IBM Technical Disclosure Bulletin, U.S. IBM Corporation, Bulletin, U.S. IBM Corporation, vol. 37, No. 10, pp. 563-564, Oct. 1, 1994.
ASCO RedHat, "2-Way Normally Closed General Purpose & Watertight Enclosure Gas Shutoff Valves ¾" to 3" NPT, 2/2 Series 8214 (200)," 8 pages, prior to Dec. 15, 2011.
ASCO RedHat, "2-Way Normally Closed General Purpose & Watertight Enclosure Gas Shutoff Valves ¾" to 3" NPT, 2/2 Series 8214 (200) AH(E) V710(B)," 6 pages, prior to Dec. 15, 2011.
ASCO Valve, Inc., "8290 Series Angle Body Piston Valves, Introducing the All New 8290 Assembly Configurator," 12 pages, prior to Dec. 15, 2011.
ASCO, "2-Way Normally Closed V710(B) Valve Body Pipe Sizes ¾" to 3" NPT, Series V710(B)," 4 pages, prior to Dec. 15, 2011.
ASCO, "On/Off General Purpose & Watertight Hydramotor Actuator for Use with V710 Gas Valve Body, Series AH2E," 2 pages, prior to Dec. 15, 2011.
Athavale et al., "Coupled Electrostatics-Structures-Fluidic Simulations of a Bead Mesopump," Proceedings of the International Mechanical Engineers Congress & Exhibition, pp. 1-7, Oct. 1999.
Bertz et al., "Silicon Grooves With Sidewall Angles Down to 1° made by Dry Etching", pp. 331-339, prior to Dec. 29, 2004.
Bonne et al. "Actuation-Based Fuel Gas Microsensors", IGT Symposium on "Natural Gas Quality, Energy Measurement, Metering and Utilization Practices", 17 pages, Mar. 2001.
Branebjerg, "A New Electrostatic Actuator Providing Improved Stroke Length and Force." IEEE, pp. 6-11, Feb. 4-7, 1992.
Bustgens et al., "Micropump Manufactured by Thermoplastic Molding" IEEE, pp. 18-21, 1994.
Cabuz et al., "Factors Enhancing the Reliability of Touch-Mode Electrostatic Actuators," Sensors and Actuators 79, pp. 245-250, 2000.
Cabuz et al., "Mesoscopic Sampler Based on 3D Array of Electrostatically Activated Diaphragms," Proceedings of the 10th Int. Conf. On Solid-State Sensors and Actuators, Transducers 1999.
Cabuz et al., "The Dual Diaphragm Pump," 4 pages prior to Dec. 29, 2004.
Cabuz, "Dielectric Related Effects in Micromachined Electrostatic Actuators," IEEE, 1999 Conference on Electrical Insulation and Dielectric Phenomena, pp. 327-332, 1999.
Cabuz, "Electrical Phenomena at the Interface of Rolling-Contact, Electrostatic Actuators," 16 pages, prior to Dec. 29, 2004.
Cabuz, et al., "High Reliability Touch-Mode Electrostatic Actuators", Technical Digest of the Solid State Sensor and Actuator Workshop, Hilton Head, S.C., , pp. 296-299, Jun. 8-11, 1998.
Cabuz. "Tradeoffs in MEMS Materials," SPIE, vol. 2881, pp. 160-170, prior to Dec. 29, 2004.
Carlisle, "10 Tips on Valve-Proving Systems," Karl Dungs Inc., 5 pages, Aug. 1, 2002, printed May 23, 2012.
European Search Report for EP Application No. 12196394.6 dated May 23, 2013.
European Search Report for EP Application No. 12196396.1 dated Jun. 11, 2013.
European Search Report for EP Application No. 12196398.7 dated Jun. 11, 2013.
Examination Report for EP Application No. 12196398.7, dated Apr. 11, 2014.
Dungs Combustion Controls, "Double Solenoid Valve Combined Pressure Regulator and Safety Valves Servo Pressure Regulator, MBC- . . . -SE DN 65 DN 125," 8 pages, prior to Dec. 15, 2011.
Dungs Combustion Controls, "Double Solenoid Valve Combined Pressure Regulator and Safety Valves Infinitely Variable Operating Mode, MBC- . . . -VEF DN65—DN100," 8 pages, prior to Dec. 15, 2011.
Dungs Combustion Controls, "Double Solenoid Valve Control and Safety Combination Valve Servo Pressure Controller, DMV-SE 507/11—525/11," 8 pages, prior to Dec. 15, 2011.

Dungs Combustion Controls, "Double Solenoid Valve Regulator and Safety Combination Infinitely Variable Floating Operation, DMV-VEF 507-525," 8 pages, prior to Dec. 15, 2011.
Dungs Combustion Controls, "Gas/Air Ratio Control MB-VEF, DMV-VEF," 15 pages, prior to Dec. 15, 2011.
Dungs Combustion Controls, "GasMultiBloc Combined Regulator and Safety Shut-Off Valves Two-Stage Function, MB-ZRD(LE) 415-420 B01," pp. 1-6, prior to Dec. 15, 2011.
Dungs Combustion Controls, "GasMultiBloc Combined Regulator and Safety Valve Infinitely Variable Air/Gas Ratio Control Mode, MBC-300-VEF, MBC-700-VEF, MBC-1200-VEF," 8 pages, prior to Dec. 15, 2011.
Dungs Combustion Controls, "GasMultiBloc Combined Servo Pressure Regulator and Safety Shut-Off Valves, MBC-300-SE, MBC-700-SE, MBC-1200-SE, MBC-300-N, MBC-700-N," 8 pages, prior to Dec. 15, 2011.
Dungs Combustion Controls, "Pressure Regulator FRN Zero Pressure Regulator," 4 pages, prior to Dec. 15, 2011.
Dungs Combustion Controls, "Pressure Regulator FRS," 6 pages prior to Dec. 15, 2011.
Dungs Combustion Controls, "Pressure Regulator FRU Circulation Regulator," 4 pages, prior to Dec. 15, 2011.
Dungs Combustion Controls, "Pressure Switch for Gas, Air, Flue Gases and Combustion Products, GW 500 A4, GW 500 A4/2" 6 pages, prior to Dec. 15, 2011.
Dungs Combustion Controls, "Program,"4 pages, prior to Dec. 15, 2011.
Dungs Combustion Controls, "Valve Testing System VPS 504 for Multiple Actuators," 12 pages, prior to Dec. 15, 2011.
Dungs Combustion Controls, "Valve Testing System VPS 508 for Multiple Actuators," 12 pages, prior to Dec. 15, 2011.
Freund et al., "A Chemically Diverse Conducting Polymer-Based 'Electronic Nose'", Proceedings of the National Academy of Sciences of the United States of America, vol. 92, No. 7, pp. 2652-2656, Mar. 28, 1995.
Haig, "On a Nonvolatile Memory Cell Based on Micro-Electro-Mechanics", IEEE pp. 172-176, 1990.
Honeywell Inc., "Hall Effect Sensing and Application," 126 pages, prior to Dec. 15, 2011.
Honeywell, "RM7800L1087; RM7840G1022,L1075,L1091; EC7840L1014 Relay Modules with Valve Proving," Installation Instructions, 32 pages, 2009.
Kromschroder, "Governor with Solenoid Valve VAD Air/Gas Ratio Control with Solenoid Valve VAG," 8 pages, prior to Dec. 15, 2011.
Kromschroder, "Governor with Solenoid Valve VAD Air/Gas Ratio Control with Solenoid Valve VAG," 24 pages, prior to Dec. 15, 2011.
Kromschroder, "Solenoid Valves for Gas VAS," 28, pages, prior to Dec. 15, 2011.
Kromschroder, "Solenoid Valves for Gas VAS," 8 pages, prior to Dec. 15, 2011.
Kromschroder, "Tightness Control TC," 8 pages, 2011.
Minami K et al., "Fabrication of Distributed Electrostatic Micro Actuator (DEMA)," IEEE Journal of Microelectromechanical Systems, vol. 2, No. 3, pp. 121-127, Sep. 1993.
Ohnstein et al., "Micromachined Silicon Microvalve," IEEE, pp. 95-98, 1990.
Porex Technologies, brochure, 4 pages, prior to Dec. 29, 2004.
Shikida et al., "Characteristics of an Electrostatically-Driven Gas Valve Under High Pressure Conditions," IEEE , pp. 235-240, 1994.
Shikida et al., "Electrostatically Driven Gas Valve With High Conductance," IEEE Journal of Microelectromechanical Systems, vol. 3, No. 2, pp. 76-80, Jun. 1994.
Shikida et al., "Fabrication of An S-Shaped Microactuator," IEEE Journal of Microelectromechanical Systems, vol. 6, No. 1, pp. 18-24, Mar. 1997.
Siemens Building Technologies, "Double Gas Valves VGD20 . . . , VGD40 . . . ," 12 pages, Aug. 5, 2002.
Siemens Building Technologies, Inc., "Siemens Technical Instructions Document No. 155-512P25VG . . . ," 12 pages, Aug. 11, 2005.
Siemens Building Technologies, Inc. "SKP . . . 15U . . . Gas Valve Actuator with Safety Shutoff Function," Document No. 155-751 SKP15 . . . U. . . , 5 pages, Jul. 1, 2005.

(56) References Cited

OTHER PUBLICATIONS

Siemens Building Technologies, Inc., "SKP25 . . . U . . . Air/Gas Ratio Controlling Gas Valve Actuator with Safety Shutoff Function," Technical Instructions Document No. 155-754, SKP25 . . . U, 9 pages, Jul. 1, 2005.

Siemens Building Technologies Inc., "SKP25 . . . U . . . Pressure Regulating Gas Valve Actuator with Safety Shut-Off Function," Technical Instructions Document No. 155-752, SKP25 . . . U, 7 pages, Jul. 1, 2005.

Srinivasan et al., "Self-Assembled Fluorocarbon Films for Enhanced Stiction Reduction", IEEE Transducers, 1997 International Conference on Solid-State Sensors and Actuators, Chicago, pp. 1399-1402, Jun. 16-19, 1997.

Wagner et al., "Bistable Microvalve with Pneumatically Coupled Membranes," IEEE, pp. 384-388, 1996.

www.combustion911.com/products/valve-proving-controls-tc-410.html, "Kromschroeder Valve Proving Controls TC410," 7 pages, prior to Dec. 15, 2011, printed May 23, 2012.

Yang et al., "Fluorescent Porous Polymer Films as TNT Chemosensors: Electronic and Structural Effects", J. Am. Chem. Soc., pp. 11864-11873 1998.

Yang et al., "Porous Shape Persistent Fluorescent Polymer Films: An Approach to TNT Sensory Materials", J. Am. Chem. Soc., pp. 5321-5322, 1998.

VALVE OVER-TRAVEL MECHANISM

The present application is a continuation-in-part of U.S. patent application Ser. No. 14/107,842, filed Dec. 16, 2013, and entitled "Visual Indicator for a Safety Shut Off Valve". U.S. patent application Ser. No. 14/107,842, filed Dec. 16, 2013, is hereby incorporated by reference.

BACKGROUND

The present disclosure pertains to valves and particularly to valve having safety features.

SUMMARY

The disclosure reveals a valve having an over-travel spring that does not necessarily need an excessively additional force to further close the valve once its valve seal, seal structure, disk or plate comes into contact with a valve seat. The feature may be achieved by inserting an over-travel spring between a main plate or stop attached to a valve stem and a valve seal structure. The valve seal may come in contact with a valve seat when the valve is closed with movement of the valve stem. The valve stem may continue to travel after contact between the valve seal structure and the valve seat without additional force, other than that of compressing the over-travel spring, and thus cause a proof-of-closure sensor to indicate closure. Also, there may be a detector that indicates a position of the valve control stem. The stem may be moved in either direction for closing and opening the valve. The stem may be moved with an actuation from a solenoid, gear-motor actuator, a fluid power actuator, or other device.

DESCRIPTION

Figure 1:
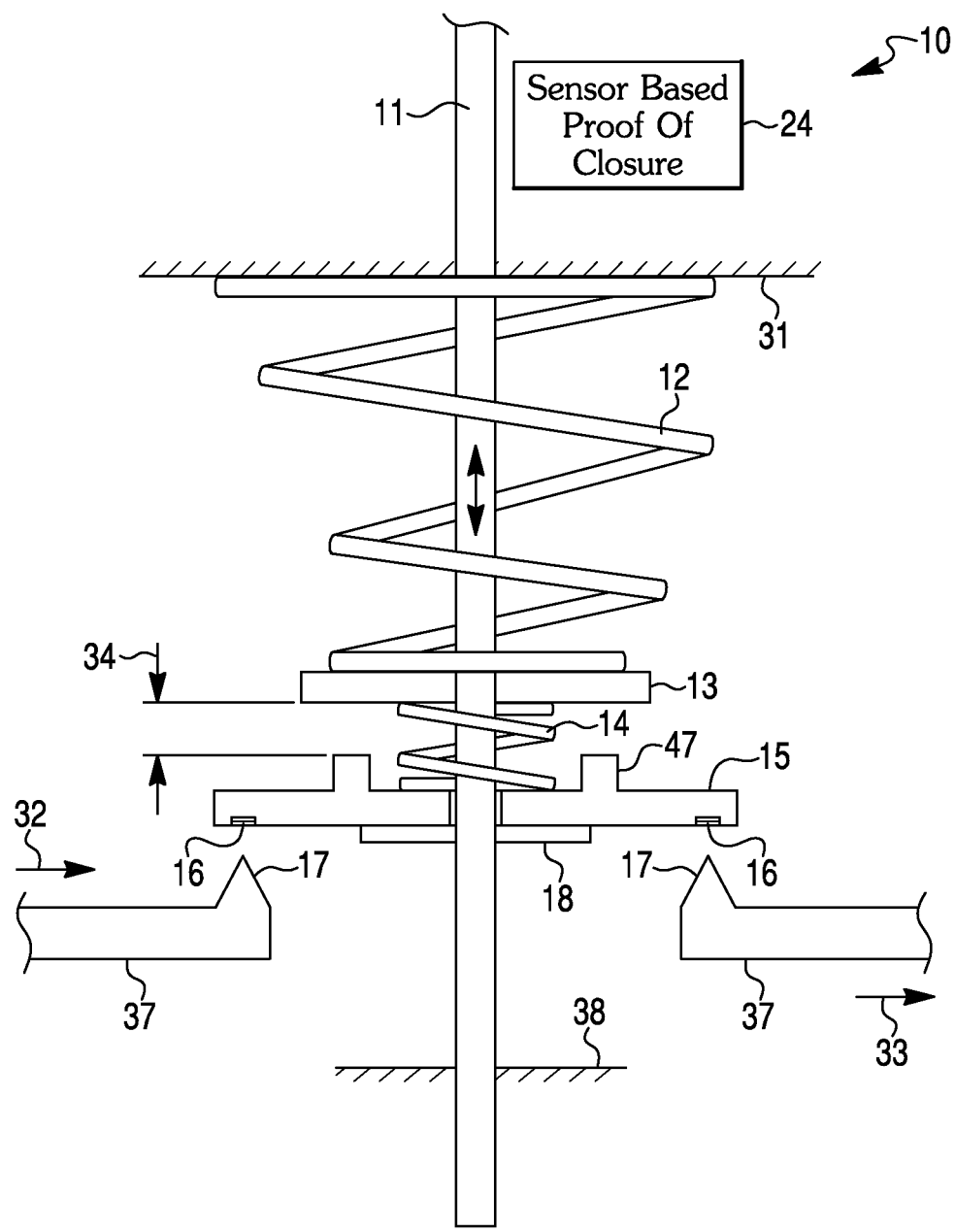
FIGS. 1, 2 and 3 are diagrams showing different stages of closure of the present valve.

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

Commercial and industrial burner systems above a certain firing rate appear to be required by code and agency standards to employ a secondary safety check known as proof-of-closure (POC) interlock. This feature may typically be located on the automatic safety shut-off valves of the system. Proof-of-closure interlock functionality appears to require, by code, that a switch be employed which closes when the valve is closed and opens when the valve is open. The code may also require that the valve shut-off be set to a prescribed leakage of 1 cubic ft. per hour (CFH) before the switch closes.

The nature of this function may typically require some form of differential travel at the seat of the valve. Due to manufacturing tolerances, it is not necessarily possible to reliably close a switch and shut-off the valve to a prescribed leakage simultaneously. This seems to necessitate that the valve closure member incorporate a form of differential travel, referred to as over-travel, in order to overcome the tolerance issue. A sequence for valve closure may be that when the power is turned off, the valve may close first to a maximum leakage rate of, for instance, 1 CFH and then fully. Thus, the POC switch should be closed/opened between the states of 1 CFH leakage and fully closed.

To accomplish a feat, several primary techniques may be employed, that is, stem over-travel and seal over-travel. Stem over-travel may involve the valve stem (or a portion of it) continuing to close after leakage has been shut-off to 1 CFH or less. Seal over-travel may incorporate an auxiliary valve seal and a primary seal, and a valve seat. The auxiliary seal may contact the seat first to reduce the leakage to 1 CFH, but remain compliant enough that the rest of the valve mechanism may continue to travel until a primary seal engages and shuts off forward leakage entirely.

An issue with stem over-travel is that it may introduce mechanical complications on nearly all types of valves. The issue with seal over-travel is that it may introduce a mechanical complication and require an additional closing force. The additional closing force may generally be undesirable because it typically requires a larger actuator to overcome a larger force, which means a less compact and more inefficient valve design. A larger than necessary force between the seal and seat may ruin the valve seal and/or valve seat.

A challenge may be how one constructs an over-travel mechanism that does not require additional closing force to operate. Herein, an over-travel mechanism may be designed in such a way that it does not require additional force to be operated. This feature may be achieved primarily by inserting a secondary spring (over-travel spring); in this case, a compression spring is between the closing member and a plunger. This construction appears new because it may simultaneously achieve two desirable goals—it does not necessarily diminish the sealing force when the valve is in the closed state and it contributes to the opening force on the plunger as it moves through the over-travel stroke. This approach may allow for improved design efficiency as the actuator may be reduced in size, cost, and so on.

A compression spring (over-travel spring) may be inserted between the main valve closing member and the solenoid or plunger to provide a biasing force during the over-travel stroke of the valve. The compression spring should be designed to be weaker than the main closing spring. The main closing spring therefore may overcome the over-travel spring in the closed state and move the over-travel mechanism to its closed state hard stop. When the valve is opened, the main closing spring force may be counter-acted by a valve actuator, which can allow the over-travel spring to bias the mechanism to its open state hard stop. A difference in travel between these hard stops may be the valve's over-travel.

Since the over-travel spring may be inserted between a main valve closure member and the main valve plunger (and not necessarily the valve "frame" like come valve constructions), its equal and opposite forces can be exerted on the main valve plunger and the main valve closure member, and may be internal forces from the mechanism's point of view.

This means that a sealing force is not necessarily diminished by a presence of the over-travel spring, but the opening force may be assisted.

Figure 2:
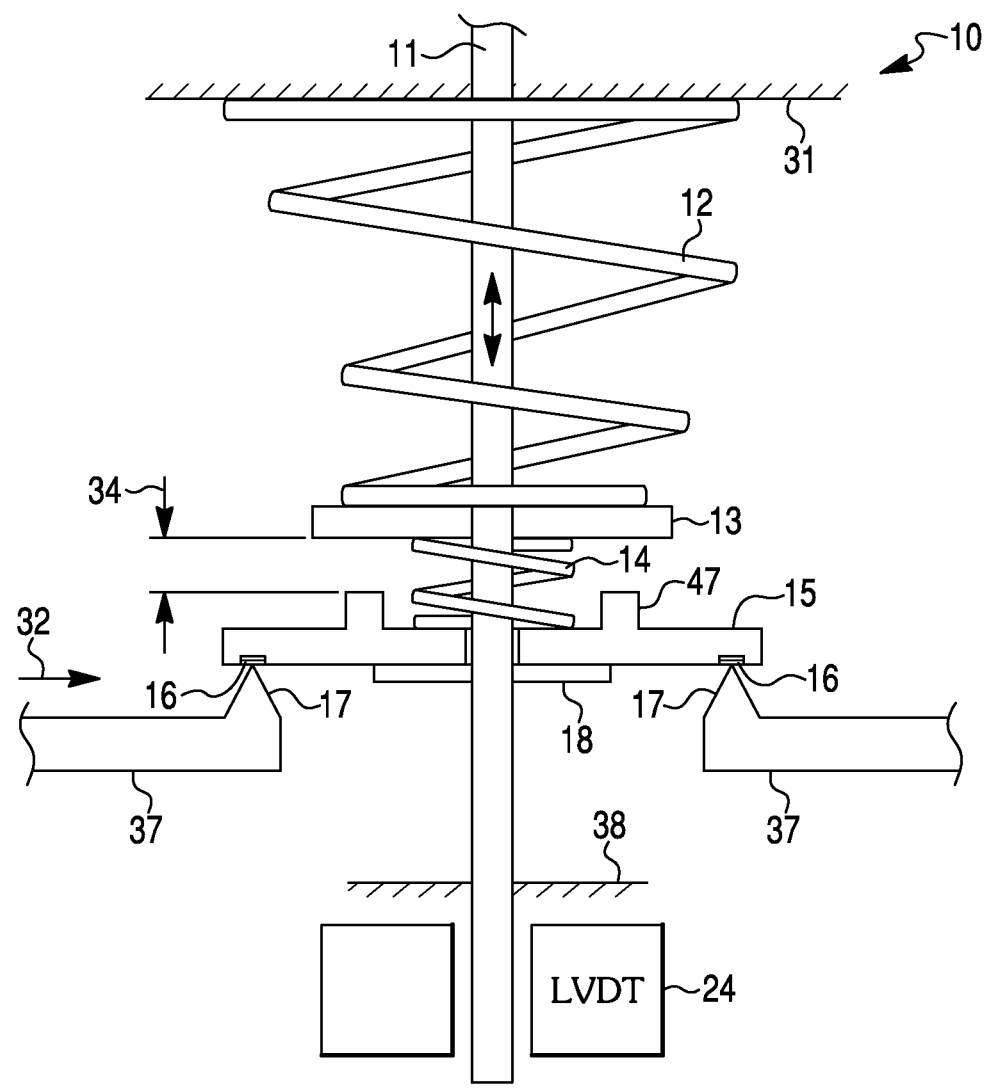
Figure 3:
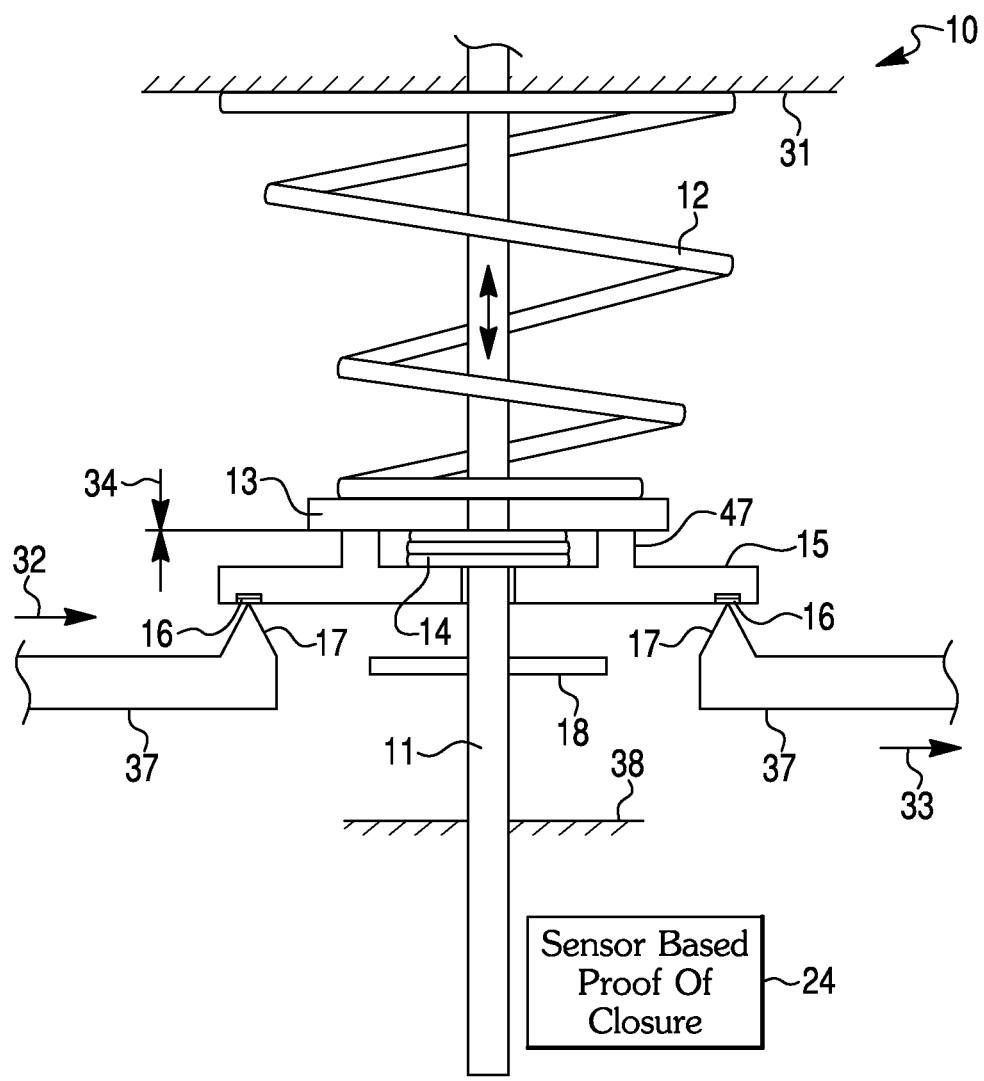

FIGS. 1, 2 and 3 are diagrams of a valve over-travel mechanism for a valve 10, revealing an open state, an almost closed state and a firmly closed state, respectively. A valve stem 11 may extend through a support 31 and support 38 38 that are rigid with respect to the valve body. Support 31 may hold one end of a main spring 12. The other end of main spring 12 may be attached to a main disk or plate 13. The other side of main plate 13 may have one end of an over-travel spring 14 attached to it. The other side of over-travel spring 14 may be attached to a valve seal disk, plate or structure 15. Valve seal or valve seal structure 15 may have a valve sealing item 16 that can be brought against a valve seat 17 for when valve 10 is closed.

A retaining ring 18 may be rigidly linked to valve stem 11 (i.e., not to the valve seal 15). Ring 18 contacts the valve seal 15 only during an opening stroke of the valve where it is the piece that lifts the valve seal assembly open. During closure, retaining ring 18 may fall out of contact with the valve seal 15 when valve seal item 16 and valve seat 17 come into contact. In this way, over-travel may be facilitated. Over-travel may be regarded as relative movement between valve stem 11 (and components rigidly linked to stem 11) and valve seal 15 (and components rigidly linked to valve seal 15).

Movement of valve stem 11 and main valve disk or plate 13 may move over-travel spring 14 and valve seal 15 in one direction or the other.

If valve seal 15 has its valve seal item 16 lifted up from valve seat 17, then a fluid may flow through that portion of valve 10 as indicated by arrows 32 and 33. An inlet pressure of a fluid to valve 10 may be measured at arrow 32. Proximate to valve stem 11 may be a sensor based proof of closure detector 24. Sensor 24 may be a linear variable differential transformer (LVDT) assembly. Sensor 24 may consist of another technology.

Valve seat 17 is shown in FIG. 1 as a sectional area of a body portion 37 of valve 10. Between a top portion or shoulder 47 of valve seal 15, and main plate 13, there may be an over-travel gap 34. When the valve is open, there may be no or minimal compression of over-travel spring 14. Gap 34 may be at its widest. When the valve is fully closed, shoulder 47 may prevent over-compression of spring 14 as shown in FIG. 3.

Figure 4:
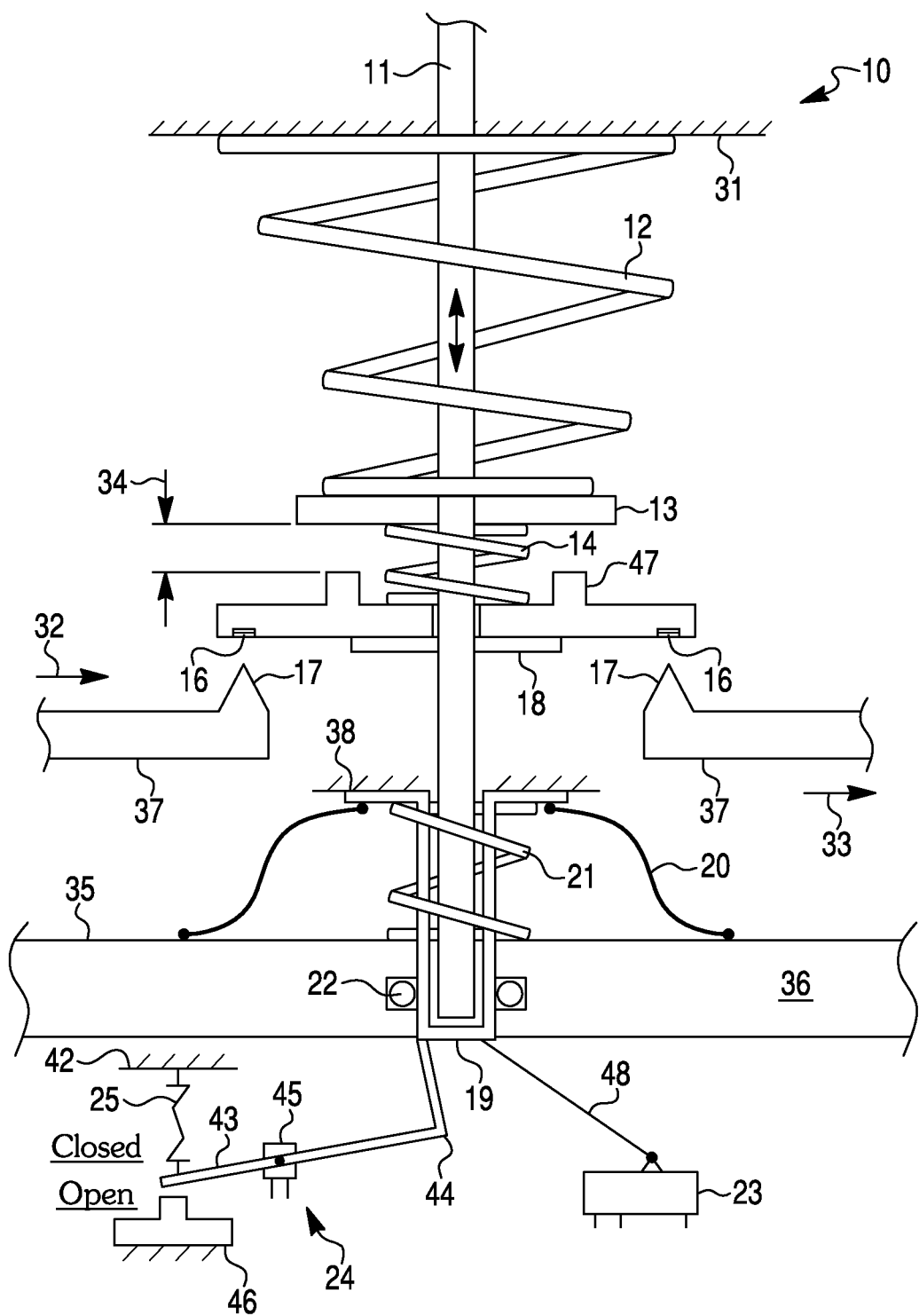
FIG. 4 is a diagram of the valve with various control rod detection mechanisms.

In FIG. 4, valve stem 11 may extend down into a tube 19. A diaphragm 20 may have a central open portion connected on an upper flange of tube 19. An outer portion or edge of diaphragm 20 may be attached to an upper surface 35 of a sectional area of valve body 36. A tube return spring 21 may have an upper end against a lower surface of outer flange of tube 19 and a lower end against upper surface 35 of the sectional area of valve body 36. Stem 11 and tube 19 may extend through valve body 36. An O-ring 22 may be situated around tube 19 and in a slot in valve body 36 in lieu of using a diaphragm 20. Tube 19 may be closed at its bottom end. Valve stem 11 may move down against the bottom end of tube 19 and move tube 19 downward from its starting position when the flange of tube 19 is situated up against a support 38 that is rigid with respect to the valve body 36.

One kind of a proof of closure switch 23 may have a lever 48 that touches the bottom end of tube 19. When valve seal item 16 of valve seal 15 is against valve seat 17 such that no fluid can flow from the volume of arrow 32 to a volume of arrow 33, then tube 19 may cause the lever 48 of proof of closure switch 23 to indicate that valve 10 is closed.

A position indicator 24 may have a structure that is in contact with the bottom end of tube 19. As stem 11 moves up, valve 10 may open and tube 19 may move up with the flange of tube 19, eventually with tube 19 stopping when the flange comes in contact with support 38. Tube return spring 21 may assure upward movement of tube 19 as stem 11 moves up during an opening of valve 10. Position indicator 24 may detect the position of tube 19 so as to indicate the opening of valve 10. Likewise, when stem 11 moves downward where a contact of valve seal 16 with valve seat 17 occurs resulting in a closure of valve 10, position indicator 24 may detect another position of tube 19 so as to indicate closure of valve 10.

A position indicator return spring 25 may have one end situated against a support 42 and the other end against a structure 43 of position indicator 24 so as to keep a structure 44 of indicator 24 against the closed end of tube 19, as structures 43 and 44 of indicator 24 may pivot at a point 45. Point 45 may have a sensor indicating a position of structures 43 and 44. Position indicator return spring 25 may be under compression between support 42 and structure 43. Structure 43 may be stopped at a support 46, which may be rigid with respect to the valve body, when the closed end of tube 19 moves up so much during a valve opening in that structure 44 no longer is in contact with the closed end of tube 19. Structure portion 43 may point to a "Closed" mark when the valve is closed and to an "Open" mark when the valve is open.

Figure 5:
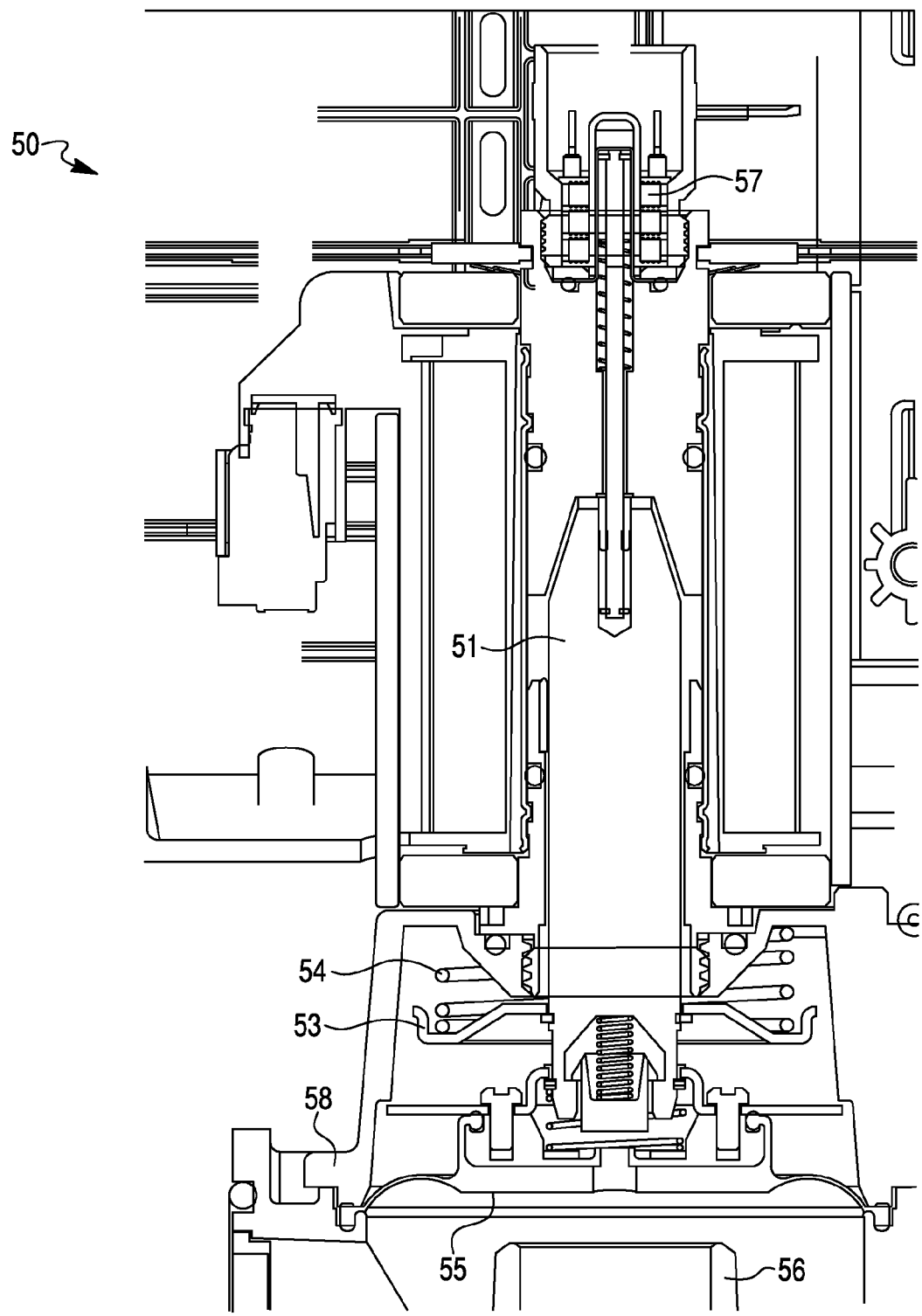
FIGS. 5 and 6 are diagrams of a valve showing different views of a fabricated example of the present valve.
Figure 6:
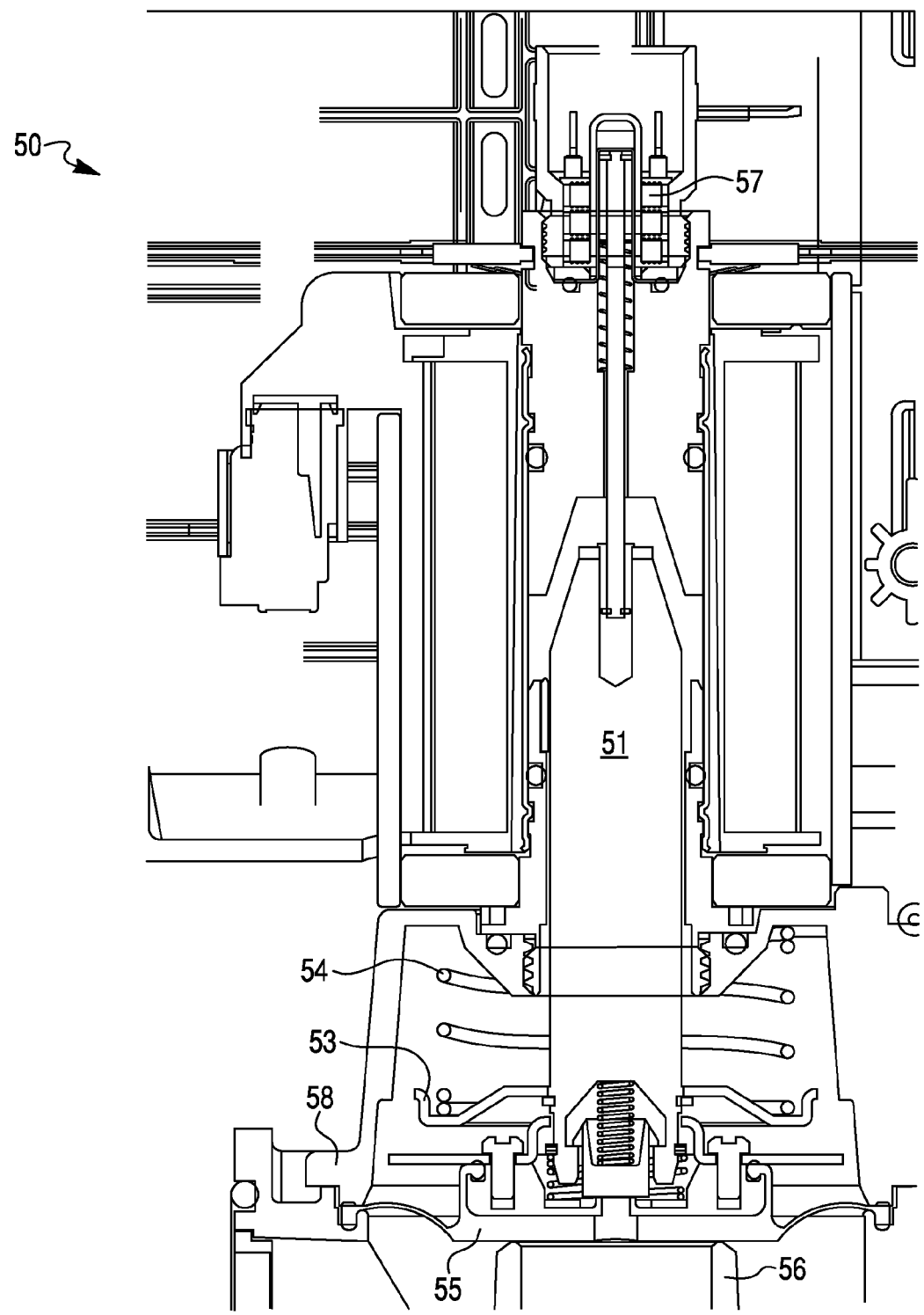

FIGS. 5 and 6 are diagrams showing different views of an example valve assembly 50 of the present valve in an open state and a closed state, respectively. The primary components may incorporate a valve body 58, a main plate 53, a main spring 54, a solenoid or plunger 51, an over-travel spring 52 and valve seal structure 55 that may come in contact with a valve seat 56 to close the valve. A position sensor 57 may be an LVDT assembly which may be a proof of closure position sensor used in place of a snap switch. Position sensor 57 may be of another technology.

To recap, a valve mechanism may incorporate a valve body, a valve stem situated in the valve body and moveable in first and second directions of a longitude dimension of the valve stem, a valve seat within the valve body, a main plate attached to the valve stem with the valve stem perpendicular to the main plate, an over-travel spring having a first end attached to the main plate, a valve seal structure having a first surface attached to a second end of the over-travel spring with the valve stem perpendicular to the first surface of the valve seal structure, and a valve seat attached to a rigid support of the valve body, facing a second surface of the valve seal structure. Moving the valve stem in the first direction of the longitudinal dimension of the valve stem may result in movement of the main plate pushing the over-travel spring and in turn pushing the valve seal structure towards the valve seat to reduce or stop a possible flow of a fluid between the valve seal structure and the valve seat.

Moving the valve stem in the second longitudinal direction of the valve stem may result in a movement of the main plate pulling the over-travel spring and in turn pulling the valve seal structure away from the valve seat to begin or increase a possible flow of a fluid between the valve seal structure and the valve seat.

Figure 7:
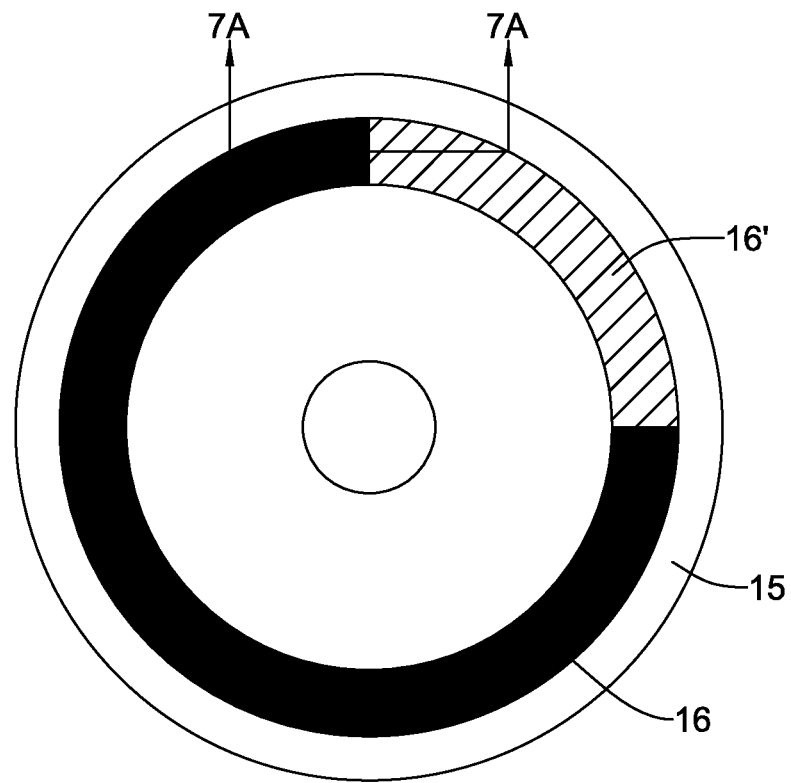
FIGS. 7 and 7A are exemplary diagrams of an alternate form of a valve seal structure and valve seal.
Figure 7A:
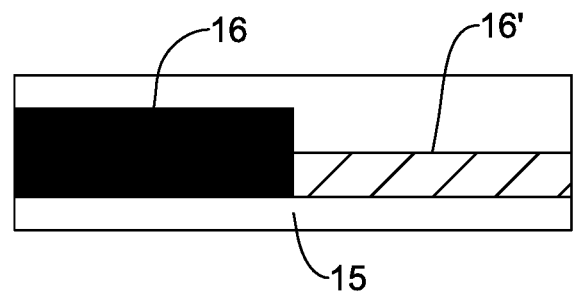

The valve mechanism may further incorporate one or more valve seals situated in the second surface of the valve seal structure for coming in contact with the valve seat to reduce or stop a flow of a fluid between the one or more valve seals and the valve seat. As may be seen in the embodiment of FIGS. 7 and 7A, an annular valve seal of a valve seal structure 15 may be segmented such that engagement between the valve seal 16, 16' and the valve seat 17 will occur incrementally as the valve seal structure 15 is advanced toward the valve seat. For example, the valve seat 17 may first contact a first seal segment 16 (black) and then may contact a second seal segment 16' (hatched) to complete the seal. It will be appreciated that the valve seal may have multiple segments and that the segments may be arranged in a variety of patterns.

A contact of a first seal of the one or more seals with the valve seat may reduce the flow of a fluid between the first seal and the valve seat to X cubic feet per hour (CFH). A contact of a second seal of the one or more seals with the valve seat may reduce the flow of a fluid between the first seal and the valve seat to Y CFH. X>Y.

When the valve stem is moved in the first direction of the longitudinal direction of the valve stem to result in movement of the main plate, that in turn may push the valve seal structure to the valve seat to reduce or stop a possible flow of a fluid between the valve seal structure and the valve seat. The valve stem may be further moved in the first direction of the longitudinal dimension of the valve stem to push the main plate against the over-travel spring that exerts more force on the valve seal structure that is in contact with the valve, resulting in compressing the over-travel spring and reducing an over-travel gap between the main plate and the valve seal structure.

The valve mechanism may further incorporate a proof of closure switch having a connection with the valve stem which results in operation of the proof of closure switch when the valve seal structure is in contact with the valve seat sufficiently to virtually stop a possible flow of a fluid between the valve seal structure and the valve seat.

The valve mechanism may further incorporate a position indicator having a sensor proximate to the valve stem to sufficiently indicate a relative position between the valve seal structure and the valve seat for revealing whether an amount of possible flow of a fluid is between the valve seal structure and the valve seat.

The valve mechanism may further incorporate a solenoid component attached to the valve stem to electrically change a position of the valve seal structure relative to the valve seat.

The valve mechanism may further incorporate a main spring having a first end attached to a rigid support of the valve body and a second end attached to the first surface of the main plate.

A valve assembly may incorporate a valve housing, a valve seat attached to the valve housing and having an opening for a possible flow of fluid through the valve seat, a valve seal having a position proximate to the valve seat to reduce or stop a possible flow of fluid through the valve seat, an over-travel spring having a first end attached to the valve seal, and a valve control rod attached to a second end of the over-travel spring. A first direction of movement of the valve control rod may result in moving the over-travel spring which moves the valve seal closer to or in contact with the valve seat. A second direction of movement of the valve control rod may result in moving the over-travel spring and the valve seal away from the valve seat.

An amount of the first direction of movement of the valve control rod that results in moving the over-travel spring and the valve seal in contact with the valve seat, may be increased to compress the over-travel spring and increase a pressure of the valve seal against the valve seat.

The valve assembly may further incorporate one or more items for indicating a position of the valve control rod selected from a group consisting of a proof of closure sensor and a position detector.

The valve assembly may further incorporate an actuator connected to the valve control rod. The actuator may be selected from a group consisting of a plunger, a gear motor actuator, and a fluid power actor.

The valve control rod may be a plunger.

The first direction of movement of the valve control rod may result in moving the over-travel spring and in turn the valve seal having a first increment seal in contact with the valve seat to reduce a leakage of a fluid through the opening of the valve seat to no more than X CFH. The first direction of additional movement of the valve control rod may result in moving the over-travel spring and in turn the valve seal having a second increment seal in contact with the valve seat to reduce a leakage of the fluid through the opening of the valve seat to less than X CFH. X may be a number.

An approach for controlling a flow of fluid, may incorporate presenting a fluid with a pressure to an input of a valve body, regulating a flow of the fluid from the input to an output of the valve body by adjusting positions of a valve seal and a valve seat relative to each other, and moving a valve stem relative to the valve body having an over-travel spring with a first end attached to the valve stem and a second end connected to the valve seal to adjust positions of the valve seal and the valve seat relative to each other to regulate the flow of the fluid from the input to the output of the valve body.

The valve stem may be a solenoid.

The flow of fluid from the input to the output of the valve body may be reduced or stopped by adjusting the positions of the valve seal and the valve seat such that the valve seal is moved to close an opening of the valve seat to reduce or stop flow of fluid through the opening of the valve seat.

The approach may further incorporate moving the valve stem an additional amount toward the valve body to compress the over-travel spring that increases a pressure of the valve seal against the valve seat.

The approach may further incorporate measuring an amount of closure by the valve seal according to a position of the valve stem relative to the valve seat with one or more items selected from a group incorporating a proof of closure sensor and a position detector.

U.S. Pat. No. 8,899,264, issued Dec. 2, 2014, is hereby incorporated by reference.

All publications and patents noted herein are incorporated by reference to the same extent as if each individual publication or patent was specifically and individually indicated to be incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A valve mechanism comprising:
   a valve body;
   a valve stem situated in the valve body and moveable in first and second directions of a longitude dimension of the valve stem;

a main plate attached to the valve stem with the valve stem perpendicular to the main plate, wherein the main plate has a first surface and a second surface;

an over-travel spring having a first end attached to the second surface of the main plate;

a valve seal structure having a first surface attached to a second end of the over-travel spring, with the valve stem perpendicular to the first surface of the valve seal structure; and a single valve seat attached to a rigid support of the valve body, facing a second surface of the valve seal structure; and wherein moving the valve stem in the first direction of the longitudinal dimension of the valve stem results in movement of the main plate pushing the over-travel spring and in turn pushing the valve seal structure towards the single valve seat to reduce or stop a flow of a fluid between the valve seal structure and the single valve seat, further comprising one or more additional valve seals situated in the second surface of the valve seal structure for coming in contact with the single valve seat to reduce or stop a flow of the fluid between the one or more additional valve seals and the single valve seat, wherein a contact of a first seal of the one or more seals with the single valve seat can reduce the flow of the fluid between the first seal and the single valve seat to X cubic feet per hour (CFH); and a contact of a second seal of the one or more seals with the single valve seat can reduce the flow of the fluid between the first seal and the single valve seat to Y CFH; and

X>Y.

2. The valve mechanism of claim 1, wherein moving the valve stem in the second longitudinal direction of the valve stem results in a movement of the main plate pulling the over-travel spring and in turn pulling the valve seal structure away from the single valve seat to begin or increase a flow of the fluid between the valve seal structure and the single valve seat.

3. The valve mechanism of claim 1, wherein:

when the valve stem is moved in the first direction of the longitudinal direction of the valve stem to result in movement of the main plate, that in turn pushes the valve seal structure to the single valve seat to reduce or stop a flow of the fluid between the valve seal structure and the single valve seat; and the valve stem can be further moved in the first direction of the longitudinal dimension of the valve stem to push the main plate against the over-travel spring that exerts more force on the valve seal structure that is in contact with the valve, resulting in compressing the over-travel spring and reducing an over-travel gap between the main plate and the valve seal structure.

4. The valve mechanism of claim 1, further comprising a proof of closure switch having a connection with the valve stem which results in operation of the proof of closure switch when the valve seal structure is in contact with the single valve seat sufficiently to virtually stop a flow of the fluid between the valve seal structure and the single valve seat.

5. The valve mechanism of claim 1, further comprising a position indicator having a sensor proximate to the valve stem to sufficiently indicate a relative position between the valve seal structure and the single valve seat for revealing whether an amount of flow of the fluid is between the valve seal structure and the single valve seat.

6. The valve mechanism of claim 1, further comprising a solenoid component attached to the valve stem to electrically change a position of the valve seal structure relative to the single valve seat.

7. The valve mechanism of claim 1, further comprising a main spring having a first end attached to a rigid support of the valve body and a second end attached to the first surface of the main plate.

8. A valve assembly comprising:

a valve housing;

a single valve seat attached to the valve housing and having an opening for a flow of fluid through the single valve seat;

a valve seal having a position proximate to the single valve seat to reduce or stop a flow of fluid through the single valve seat;

an over-travel spring having a first end attached to the valve seal; and a valve control rod attached to a second end of the over-travel spring; and wherein:

a first direction of movement of the valve control rod results in moving the over-travel spring which moves the valve seal closer to or in contact with the single valve seat; and a second direction of movement of the valve control rod results in moving the over-travel spring and the valve seal away from the single valve seat, wherein the first direction of movement of the valve control rod results in moving the over-travel spring and in turn the valve seal having a first increment seal in contact with the single valve seat to reduce a leakage of the fluid through the opening of the single valve seat to no more than X CFH;

the first direction of additional movement of the valve control rod results in moving the over-travel spring and in turn the valve seal having a second increment seal in contact with the single valve seat to reduce a leakage of the fluid through the opening of the single valve seat to less than X CFH; and X is a number.

9. The valve assembly of claim 8, wherein an amount of the first direction of movement of the valve control rod that results in moving the over-travel spring and the valve seal in contact with the single valve seat, can be increased to compress the over-travel spring and increase a pressure of the valve seal against the single valve seat.

10. The valve assembly of claim 9, further comprising one or more items for indicating a position of the valve control rod selected from a group consisting of a proof of closure sensor and a position detector.

11. The valve assembly of claim 9, further comprising an actuator connected to the valve control rod.

12. The valve assembly of claim 11, wherein the actuator is selected from a group comprising a plunger, a gear motor actuator, and a fluid power actor.

13. The valve assembly of claim 9, wherein the valve control rod is a plunger.

* * * * *